(12) United States Patent
Hoch

(10) Patent No.: US 9,727,176 B2
(45) Date of Patent: Aug. 8, 2017

(54) CAPACITIVE SENSOR PATTERN

(75) Inventor: David Hoch, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 1259 days.

(21) Appl. No.: 13/165,498

(22) Filed: Jun. 21, 2011

(65) Prior Publication Data

US 2012/0327012 A1 Dec. 27, 2012

(51) Int. Cl.
*G06F 3/044* (2006.01)

(52) U.S. Cl.
CPC .................................. *G06F 3/044* (2013.01)

(58) Field of Classification Search
USPC ...... 345/173–178, 156, 157; 178/18.01, 103, 178/18.03
See application file for complete search history.

(56) References Cited

U.S. PATENT DOCUMENTS

| | | | |
|---|---|---|---|
| 4,290,052 A * | 9/1981 | Eichelberger et al. | 341/33 |
| 6,147,680 A * | 11/2000 | Tareev | 345/173 |
| 6,188,391 B1 * | 2/2001 | Seely et al. | 345/173 |
| 7,202,859 B1 | 4/2007 | Speck et al. | |
| 8,174,510 B2 | 5/2012 | Polishchuk et al. | |
| 8,493,337 B2 | 7/2013 | Liang et al. | |
| 2007/0257894 A1 | 11/2007 | Philipp | |
| 2007/0262962 A1 * | 11/2007 | XiaoPing et al. | 345/173 |
| 2008/0150906 A1 * | 6/2008 | Grivna | 345/173 |
| 2008/0316182 A1 | 12/2008 | Antila et al. | |
| 2009/0046072 A1 | 2/2009 | Emig et al. | |
| 2009/0184937 A1 | 7/2009 | Grivna | |
| 2010/0045613 A1 | 2/2010 | Wu et al. | |
| 2010/0045625 A1 | 2/2010 | Yang et al. | |
| 2010/0073310 A1 * | 3/2010 | Liang et al. | 345/173 |
| 2010/0171718 A1 | 7/2010 | Denda | |
| 2010/0295564 A1 | 11/2010 | Reynolds | |
| 2011/0006998 A1 | 1/2011 | Kang et al. | |
| 2011/0148435 A1 * | 6/2011 | Schwartz et al. | 324/658 |
| 2012/0044187 A1 * | 2/2012 | Polishchuk et al. | 345/174 |

FOREIGN PATENT DOCUMENTS

| | | |
|---|---|---|
| CN | 1908881 A | 2/2007 |
| KR | 10-2007-0016684 | 2/2007 |
| TW | 200805128 A | 1/2008 |

OTHER PUBLICATIONS

ISA/KR, International Search Report and Written Opinion for International Application No. PCT/US2012/043655, 9 pages, Jan. 7, 2013 (Jan. 7, 2013).
Office Action Search Report for CN Application No. 201280030498.5, Mailed Nov. 4, 2015, 2 Pages.

* cited by examiner

*Primary Examiner* — Olga Merkoulova
(74) *Attorney, Agent, or Firm* — Osha Liang LLP

(57) ABSTRACT

A capacitive sensor pattern comprises a first plurality of sensor electrode elements, a second plurality of sensor electrode elements, and a third plurality of sensor electrode elements. The first plurality of sensor electrode elements is disposed in a first layer above a substrate. The second plurality of sensor electrode elements is disposed above the substrate in an additional layer. At least one of the second plurality of sensor electrode elements is physically coupled with at least two of the first plurality of sensor electrode elements. The third plurality of sensor electrode elements is disposed above the substrate in the additional layer. At least one element of the third plurality is ohmically coupled to a single element of said first plurality.

4 Claims, 13 Drawing Sheets

1000

DEPOSIT A FIRST PLURALITY OF SENSOR ELECTRODE ELEMENTS IN A FIRST LAYER ABOVE A SUBSTRATE
1010

DEPOSIT A SECOND PLURALITY AND A THIRD PLURALITY OF SENSOR ELECTRODE ELEMENTS IN A SINGLE DEPOSITION STEP ABOVE THE SUBSTRATE, AT LEAST ONE ELEMENT FROM THE SECOND PLURALITY PHYSICALLY COUPLED TO AT LEAST TWO ELEMENTS FROM THE FIRST PLURALITY, AND AT LEAST ONE ELEMENT FROM THE THIRD PLURALITY COUPLED TO A SINGLE ELEMENT FROM THE FIRST PLURALITY
1020

FIG. 10

CAPACITIVE SENSOR PATTERN

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

A capacitive sensor pattern comprises a first plurality of sensor electrode elements, a second plurality of sensor electrode elements, and a third plurality of sensor electrode elements. The first plurality of sensor electrode elements is disposed in a first layer above a substrate. The second plurality of sensor electrode elements is disposed above the substrate in an additional layer. At least one of the second plurality of sensor electrode elements is physically coupled with at least two of the first plurality of sensor electrode elements. The third plurality of sensor electrode elements is disposed above the substrate in the additional layer. At least one element of the third plurality is coupled to a single element of the first plurality.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments of the present invention and, together with the Description of Embodiments, serve to explain principles discussed below, where like designations denote like elements, and:

FIG. 10 shows a flow diagram of an example method of manufacture of a capacitive sensor pattern, in accordance with various embodiments.

DESCRIPTION OF EMBODIMENTS

The following Description of Embodiments is merely provided by way of example and not of limitation. Furthermore, there is no intention to be bound by any expressed or implied theory presented in the preceding technical field, background, brief summary or the following detailed description.

Overview of Discussion

Herein, various embodiments are described that provide input devices, sensor patterns, and methods that facilitate improved usability. The described capacitive sensor patterns and sensor electrode elements thereof may be utilized with a capacitive sensing device. Embodiments discussed herein facilitate detection of small input objects such as the tip of a pen or other writing instrument, while also maintaining the ability to detect larger input objects such as a human digit. Additionally, some embodiments described herein spread a pixel response function of a capacitive pixel such that it overlaps partially with a pixel response function of an immediately adjacent pixel. Discussion begins with a description of an example input device with which or upon which various embodiments described herein may be implemented. Discussion then turns to description of examples of some pixel response functions. The example pixel response functions are provided so that that they may be referred to and described in relation to the examples of capacitive sensor patterns. Numerous variations of an example capacitive sensor pattern and sensor electrode elements thereof are then described. The variations may be utilized independently or in combinations with one another. An example method of manufacture of a capacitive sensor pattern is then described.

Example Input Device

Figure 1:
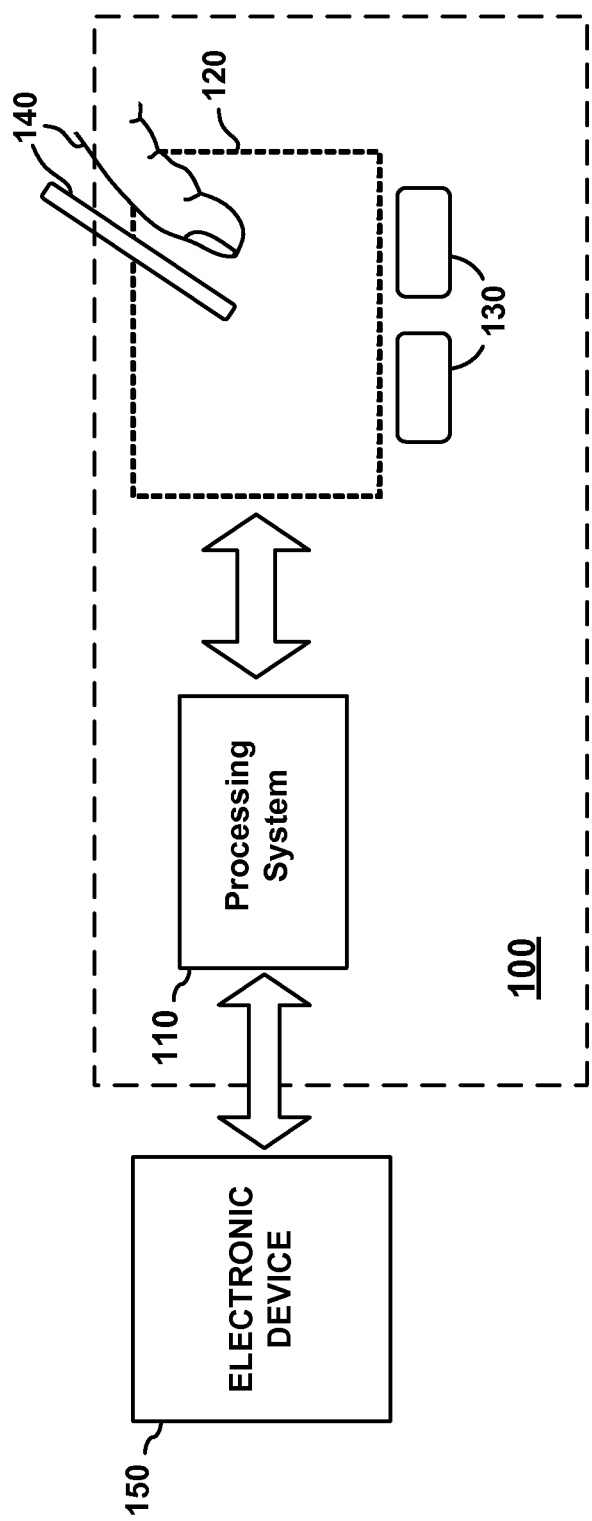
FIG. 1 is a block diagram of an example input device, in accordance with embodiments.

Turning now to the figures, FIG. 1 is a block diagram of an exemplary input device 100, in accordance with embodiments of the invention. Input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

Input device 100 can be implemented as a physical part of the electronic system, or can be physically separate from the electronic system. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g. a touch surface) of the input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in the sensing region 120. Input device 100 comprises one or more sensing elements for detecting user input. As a non-limiting example, input device 100 may use capacitive techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitter electrode elements" or "transmitters") and one or more receiver sensor electrodes (also "receiver electrodes" or "receiver electrode elements" or "receivers"). Collectively transmitters and receivers may be referred to as sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120.

In FIG. 1, a processing system 110 is shown as part of input device 100. The processing system 110 is configured to operate the hardware of input device 100 to detect input in the sensing region 120. Processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100.

In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g. to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 comprises a touch screen interface, and sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other tangible storage technology.

Example Pixel Response Functions

Figure 2:
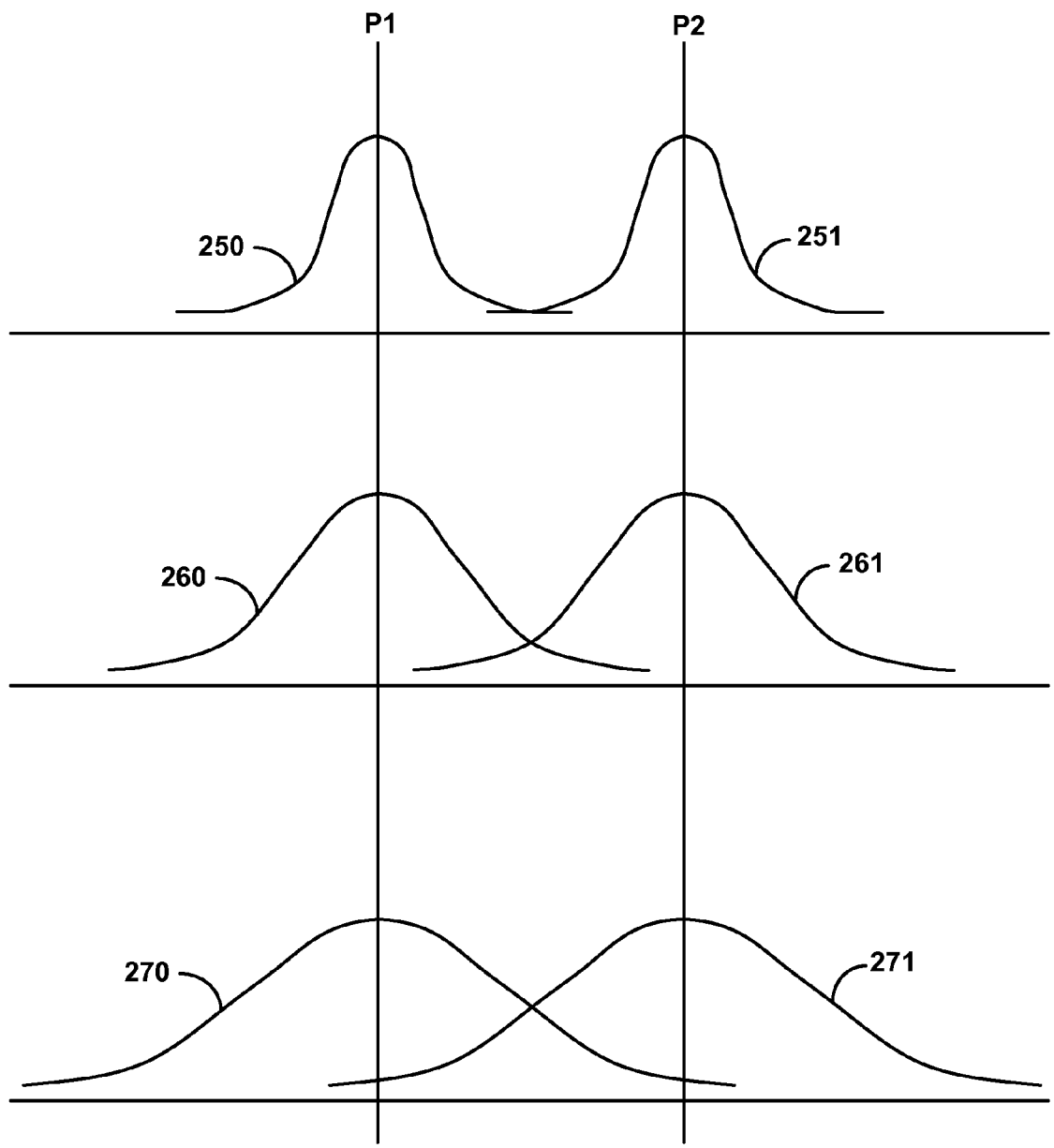
FIG. 2 illustrates some example pixel response functions, according to various embodiments.

FIG. 2 illustrates some example pixel response functions for objects of a fixed size, according to various embodiments. The depicted pixel response functions are representative of pixel response functions of various capacitive sensor patterns described herein and depict the response of two adjacent capacitive pixels as an input object moves from left to right (in the depicted capacitive sensor patterns) along a line through P1 (center of a first capacitive pixel) and P2 (center of a second and adjacent capacitive pixel). For example, pixel response functions 250, 260, and 270 are associated with capacitive pixels that are centered on points P1 in various capacitive sensing patterns illustrated herein, while pixel response functions 251, 261, and 271 are associated with capacitive pixels that are centered on points P2 in the same respective capacitive sensing patterns. Pixel response functions 250 and 251 have almost no overlap while pixel response functions 260 and 261 have moderate overlap and pixel response functions 270 and 271 have a great deal of overlap.

Example Capacitive Sensor Patterns and Sensor Electrode Elements

FIGS. 3A, 3B, 4, 5A, 5B, 6, 7A, 7B, 8, and 9 illustrate example capacitive sensor patterns, and sensor electrode elements thereof, which may be utilized in a capacitive sensor to generate all or part of the sensing region of an input device, according to various embodiments. For purposes of clarity of illustration and description, only small portions of capacitive sensor patterns are illustrated. It is appreciated that the sensor elements in the illustrated portions may be repeated to create larger capacitive sensor patterns. In the illustrated capacitive sensor patterns, a circle, P1, is illustrated at the center of an example receiver electrode/receiver electrode pair. The center of location P1 represents an example center of a capacitive pixel associated with a particular combination of a transmitter electrode element and a receiver electrode element. This capacitive pixel can be sensed in response to selectively transmitting a transmitter signal on one or more transmitter sensor electrodes and then selectively receiving a resulting signal on a receiver sensor electrode (where the resulting signal corresponds to the transmitted transmitter signal). Other capacitive pixels are centered at similar locations in the illustrated capacitive sensor patterns and are sensed in a similar fashion. For example, the center of circle P2 marks the location of the center of another capacitive pixel. Circle P1 also represents the diameter of a small input object such as the tip of a pen. In some embodiments a small input object, such as P1, may be less than one millimeter in diameter (e.g., 0.2-0.4 millimeters in some embodiments). Circle P1's surrounds circle P1 and represents a spherical cross-section of the front portion of an input object such as a pen, and would include the point of the pen and regions which surround it.

As was discussed herein in conjunction with FIG. 2, in operation, a pixel response function is associated with each capacitive pixel in the capacitive sensor patterns that are illustrated in FIGS. 3A-9. With respect to the capacitive sensor patterns described herein, moving an input object left to right across a receiver electrode element causes the pixel response function of a capacitive pixel associated with that receiver electrode element to monotonically increase above a noise floor until the pixel response function peaks when the input object reaches the center of the capacitive pixel (e.g., P1). Continuing this left to right movement causes the pixel response function to monotonically decrease until it merges with the noise floor. There are a variety of known means to electronically spread a pixel response function such that it overlaps or increasingly overlaps with the pixel response function of an immediately adjacent capacitive pixel. However, these electronic means typically involve increasing sensitivity on either or both the transmitter side or receiver side, which can often create issues such as saturation of a measurement or else result in over sensitivity to input objects which are not near the capacitive pixel. Herein, capacitive sensor patterns, and features thereof, are described which physically facilitate a controlled overlap of immediately adjacent capacitive pixels, without the drawbacks which may result from electronically achieving similar overlap.

Figure 3A:
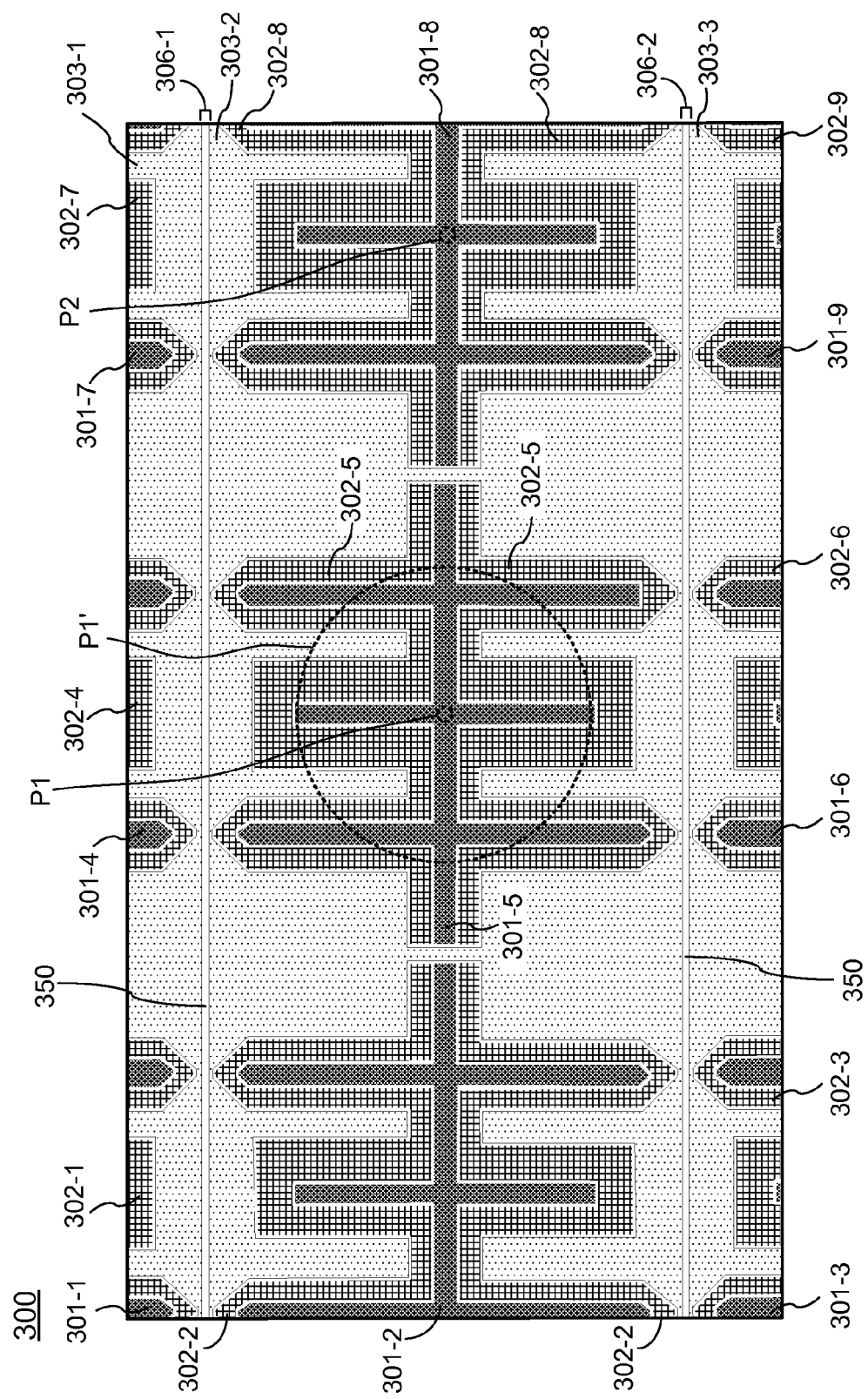
FIG. 3A illustrates features of a capacitive sensor pattern, according to various embodiments.

FIG. 3A illustrates a capacitive sensor pattern 300, according to various embodiments. Capacitive sensor pattern 300 represents a plurality of sensor electrode elements which are disposed in a single layer above a substrate. That is to say, the illustrated sensor electrode elements may be printed, disposed, or otherwise deposited in a common layer with one another. The sensor electrode elements may be composed of a conductive material, such as, but not limited to, indium tin oxide (ITO). The substrate may be glass, thermoplastic polymer resin (e.g., polyethylene terephthalate), or other material. In some embodiments, the sensor electrode elements include receiver electrode elements 301 (301-1, 301-2, 301-3, 301-4, 301-5, 301-6, 301-7, 301-8, and 301-9 visible) and transmitter electrode elements 303 (303-1, 303-2, and 303-3 visible). Transmitter electrode elements 303 are separated from one another by gaps 306 in which no conductive material is disposed. For example, gap 306-1 separates transmitter electrode element 303-1 from transmitter electrode element 303-2 and gap 306-2 separates transmitter electrode element 303-2 from transmitter sensor electrode 303-3. Substrate 350 is visible in gaps 306-1 and 306-2.

Although receiver electrode elements 301 are disposed within or surrounded by the conductive material of at least one transmitter electrode element 303, space is left between the conductive material of a receiver electrode element 301 and that of its surrounding transmitter electrode element 303. This space may expose bare substrate 350 or, may be partially filled with a material, to reduce or eliminate visible artifacts which might disturb an image viewed through a touch screen display on which capacitive sensor pattern 300 is disposed. Typically, wider gaps are filled, while narrower and therefore less visibly noticeable gaps may be unfilled. When filled, a floating electrode element 302 is formed. Herein a "floating electrode element" describes an electrode element that is not grounded, is not coupled with an electrical potential, and is not physically coupled with either a receiver electrode element or a transmitter electrode element. The material utilized to form a floating electrode element may be the same as the conductive material used to form transmitter electrode elements and receiver electrode elements. As an example, ITO may be utilized to fill gaps and form floating electrode elements 302. In addition to reducing visible artifacts, filling these gaps with a floating material may lead to a strong and defined change in a sensed transcapacitance in response to an input object interacting with the sensing region associated with a capacitive pixel.

As illustrated in FIG. 3A, gaps between receiver electrode element 301-1 and transmitter electrode element 303-1 are filled to form floating electrode element 302-1; gaps between receiver electrode element 301-2 and transmitter electrode element 303-2 are filled to form floating electrode elements 302-2; gaps between receiver electrode element 301-3 and transmitter electrode element 303-3 are filled to form floating electrode element 302-3; gaps between receiver electrode element 301-4 and transmitter electrode element 303-1 are filled to form floating electrode element 302-4; gaps between receiver electrode element 301-5 and transmitter electrode element 303-2 are filled to form floating electrode element 302-5; gaps between receiver electrode element 301-6 and transmitter electrode element 303-3 are filled to form floating electrode element 302-6; gaps between receiver electrode element 301-7 and transmitter electrode element 303-1 are filled to form floating electrode element 302-7; gaps between receiver electrode element 301-8 and transmitter electrode element 303-2 are filled to form floating electrode elements 302-9; and gaps between receiver electrode element 301-9 and transmitter electrode element 303-3 are filled to form floating electrode element 302-9. As can be seen, a floating electrode element 302 in capacitive sensor pattern 300 is disposed within a transmitter electrode element 303 and surrounded by the material of the transmitter electrode element 303 within which it is disposed.

Figure 3B:
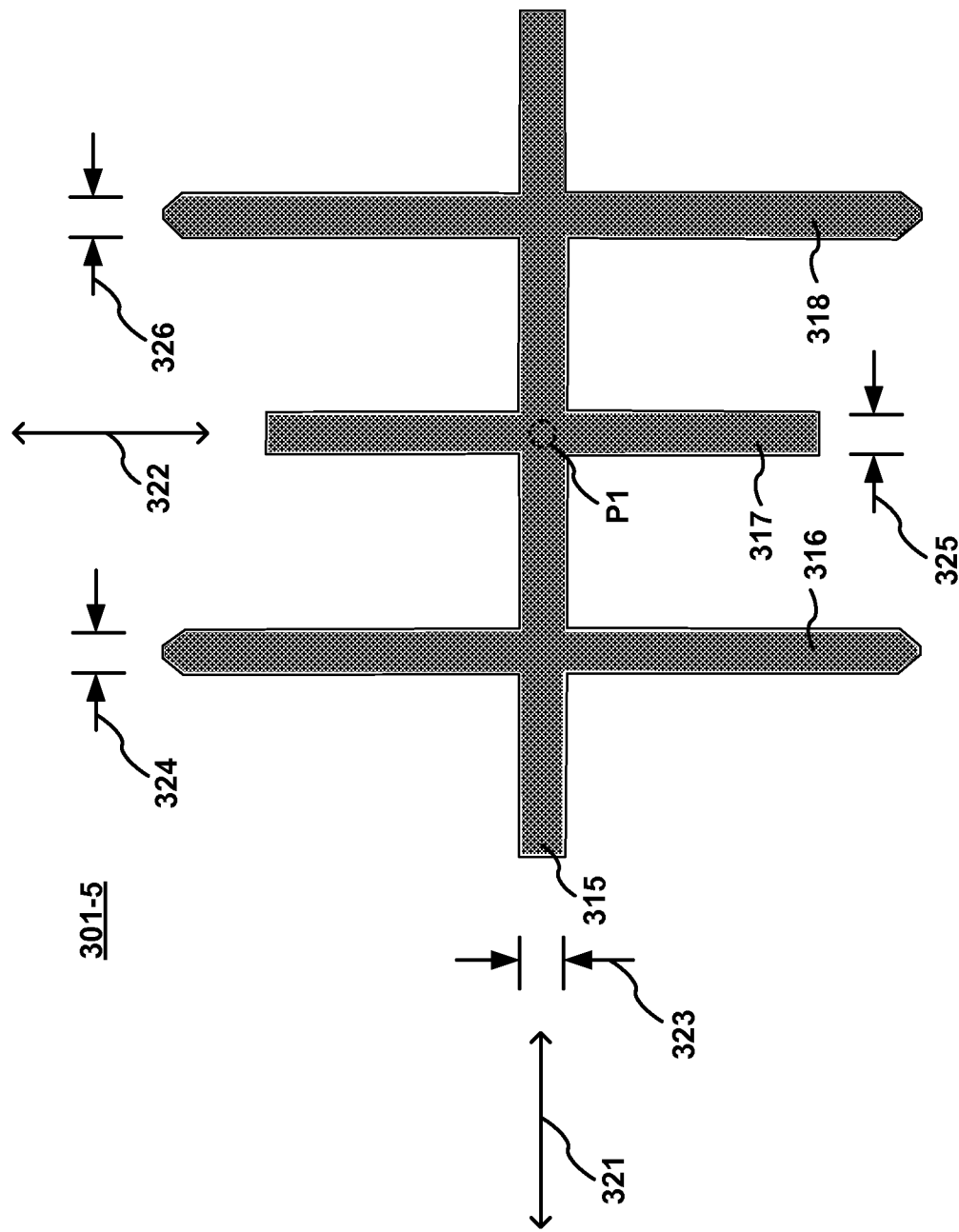
FIG. 3B illustrates an example receiver electrode element, according to various embodiments.

FIG. 3B illustrates an example receiver electrode element 301, according to various embodiments. In particular, receiver electrode element 301-5 from FIG. 3A is illustrated. It is appreciated that other receiver electrode elements 301 in capacitive sensor pattern 300 are substantially identical to receiver electrode element 301-5, except where truncated on edge portions of a capacitive sensor pattern 300. Receiver electrode element 301-5 includes a central component 315 which is disposed lengthwise along axis 321 and has a width 323. Axis 321 is parallel to the lengthwise axis of transmitter electrode element 303-2. Central component 315 is bar shaped and is traversed by components 316 and 318. The multiple prongs of receiver electrode element 301 lead to a strong pixel response function when sensing a small input object such as the tip of a pen, while also responding well when a sensing larger input object such as a human digit.

In some embodiments of capacitive sensor pattern 300, the left and right distal end portions of receiver electrode element 301-5 (and other similar receiver electrode elements 301) are the only portions which are not surrounded by a floating electrode element in capacitive sensor pattern 300. In this sense, receiver electrode element 301-5 is substantially surrounded by floating electrode element 302-5. In some embodiments, of capacitive sensor pattern 300, the left and right distal end portions are also surrounded by floating electrode element 302-5. In such embodiments, receiver electrode element 301-5 is fully surrounded by a floating electrode element.

Components 316 and 318 are also bar shaped, of the same or similar length to one another, and may have tapered end portions. Component 316 has a width 324 and component 318 has a width 326. Components 316 and 318 are disposed lengthwise in parallel with axis 322, which is substantially orthogonal to axis 321. Axis 322 is also the width axis of transmitter electrode element 303-2. By "substantially orthogonal," what is meant is that axes 321 and 322 are intended to be at right angles to one another, but may vary slightly from perpendicular due to manufacturing inconsistencies. In some embodiments, a midpoint of component 315 is also traversed by component 317. Component 317 is bar shaped, has a width 325, and is disposed lengthwise in parallel with axis 322. Component 317 is generally shorter in length than either of components 316 and 318. In some embodiments, component 317 is between 50% and 75% of the length of either of components 316 and 318.

As depicted, axis 322 runs along the midline of component 315. Axis 322 is also perpendicular with axis 321 at the midpoint (circled by point P1) of component 315. Components of receiver electrode element 301-5 are disposed such that receiver electrode element 301-5 is symmetrical when folded in half along axis 321 and when folded in half along axis 322.

In capacitive sensor pattern 300, a width 323, 324, 325, and/or 326 of receiver electrode element 301-5 is less than a width along axis 322 of transmitter electrode element 303-2 within which receiver electrode element 301-5 is wholly situated. In some embodiments of capacitive sensor pattern 300, a width 323, 324, 325, and/or 326 of receiver electrode element 301-5 is greater than a width of an adjacent floating electrode element 302-5 which is disposed between receiver electrode element 301-5 and the transmitter electrode element 303-2 within which both receiver electrode element 301-5 and floating electrode element 302-5 are wholly situated.

In capacitive sensor pattern 300, when a transmitter electrode element has a transmitter signal transmitted on it and the resulting signal is received by a receiver electrode element that is surrounded by the transmitter sensor electrode, a full capacitive pixel and its corresponding pixel response function are generated. For example, by transmitting on transmitter electrode element 303-2 and receiving a resulting signal via receiver electrode element 301-5, a transcapacitive pixel centered on P1 is created along with a corresponding pixel response function.

Figure 4:
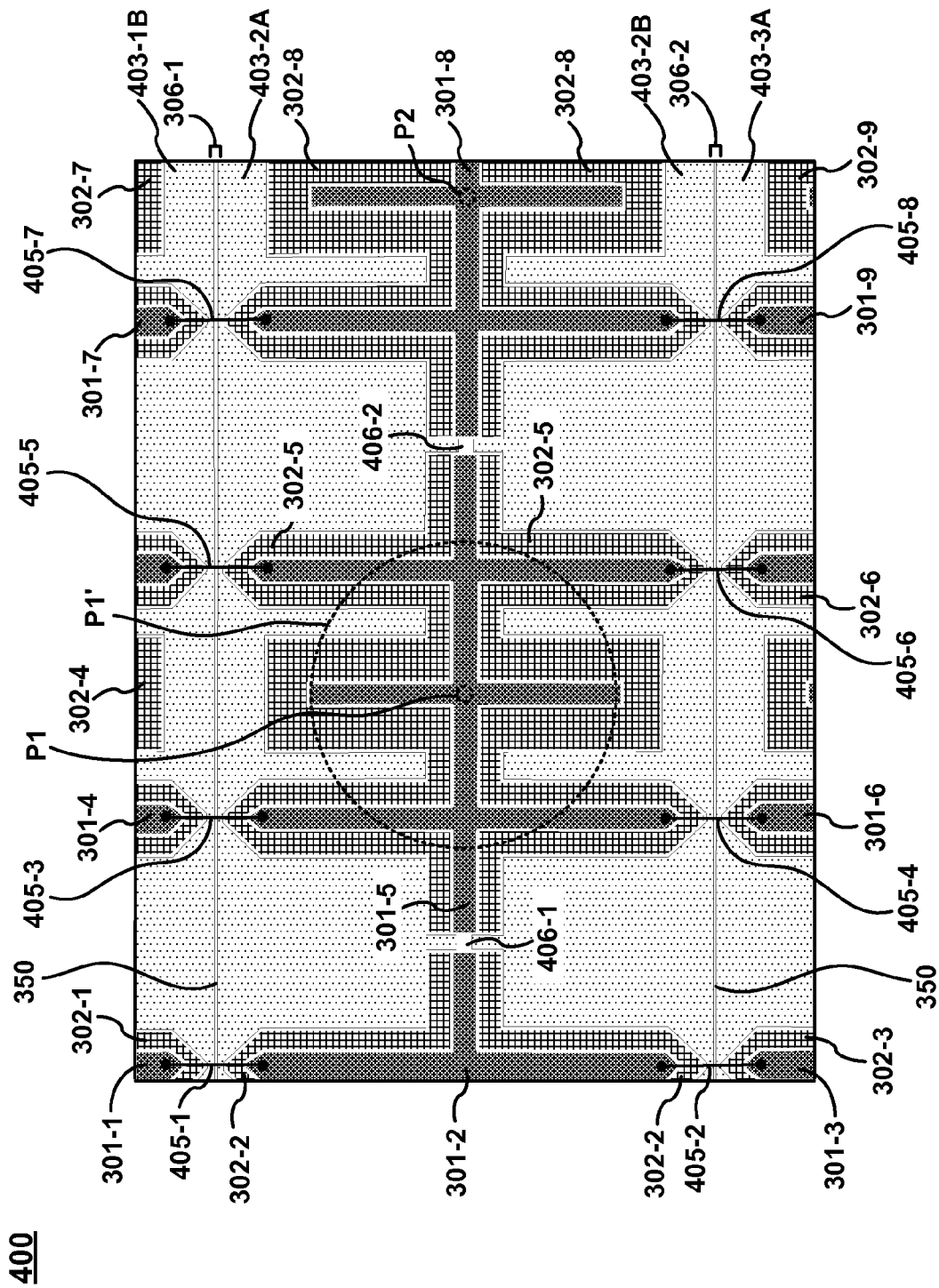
FIG. 4 illustrates features of a capacitive sensor pattern, according to various embodiments.

FIG. 4 illustrates features of a capacitive sensor pattern 400, according to various embodiments. Elements illustrated in FIGS. 3A, 3B, and 4 with like item numbers are the same. Capacitive sensor pattern 400 differs from capacitive sensor pattern 300 in two principle ways: 1) transmitter sensor elements have been split into upper (A) and lower (B) portions which can be excited (transmitted upon) together to render a full pixel response function or independently of one another when increases in image resolution are desired (such as when a small input object such as a pen tip has been detected or is attempting to be detected); and 2) jumper elements ("jumpers") are illustrated which ohmically couple individual receiver electrode elements into columns of ohmically coupled receiver electrode elements. For example, inclusion of gaps 406 (406-1 and 406-2 illustrated) between left and right distal end portions of receiver electrode elements splits transmitter electrode elements 303 of FIG. 3A into upper and lower halves such as 403-1B, 403-2A, 403-2B, and 403-3A, which are illustrated in FIG. 4. A receiver electrode element and its surrounding floating electrode element, such as receiver electrode element 301-5 and floating electrode element 302-5, are disposed within and further surrounded by the two halves of a split transmitter electrode element (e.g., upper half 403-2A and lower half 403-2B).

Jumpers 405 ohmically couple selected receiver electrode elements 301 into columns. For example receiver electrode elements 301-4, 301-5, and 301-6 are ohmically coupled together into a column. It is appreciated that receiver electrode elements 301, floating electrode elements 302, and transmitter electrode elements 303, 403 are all deposited (e.g., printed or otherwise deposited onto substrate 350) in a single common layer with one another and may be composed of the same conductive material as one another. Jumpers 405 (405-1, 405-2, 405-3, 405-4, 405-5, 405-6, 405-7, 405-8 visible) are all disposed in a jumper layer which is separate from the single layer in which receiver electrode elements 301, floating electrode elements 302, and transmitter electrode elements 303, 403 are all commonly deposited. A jumper 405 ohmically couples together two receiver electrode elements. For example, jumper 405-3 ohmically couples receiver electrode element 301-4 with receiver electrode element 301-5. Jumper 405-4 also ohmically couples receiver electrode element 301-4 with receiver electrode element 301-5.

For purposes of clarity, insulating material which prevents undesired ohmic couplings of a jumper 405 has not been illustrated. However, it is appreciated that such insulating material is disposed in a layer which is between portions of a jumper 405 and any sensor electrode elements which are spanned by a jumper element 405 but do not ohmically couple with the jumper element 405. For example, with reference to jumper 405-3, undepicted insulating material prevents jumper 405-3 from ohmically coupling with floating electrode element 302-4, transmitter electrode element 403-1B, transmitter electrode element 403-2A, and floating electrode element 302-5.

In capacitive sensor pattern 400, when both halves of a split transmitter electrode element have transmitter signals transmitted on them and their resulting signals are received by a receiver electrode element that is surrounded by the two halves of the split transmitter sensor electrode, a full capacitive pixel and its corresponding pixel response function are generated. For example, by transmitting on split transmitter electrode element 403-2A and 403-2B and receiving resulting signals via receiver electrode element 301-5, a transcapacitive pixel centered on P1 is created along with a corresponding pixel response function. In one embodiment, the pixel response function of a capacitive pixel centered on P1 in capacitive sensor pattern 400 may be similar to pixel response function 250 of FIG. 2, where the pixel response function of a capacitive pixel centered on P1 has almost no overlap with the pixel response function of a capacitive pixel centered on P2 for an object sufficiently small in size.

In capacitive sensor pattern 400, a width 323, 324, 325, and/or 326 of receiver electrode element 301-5 is less than a width along axis 322 of a transmitter electrode element 303-2A or 303-2B within which a portion of receiver electrode element 301-5 is situated. In some embodiments of capacitive sensor pattern 400, a width 323, 324, 325, and/or 326 of receiver electrode element 301-5 is may be greater or smaller than a width of an adjacent floating electrode element 302-5 which is disposed between receiver electrode element 301-5 and the transmitter electrode element 303-2A, 303-2B within which both receiver electrode element 301-5 and floating electrode element 302-5 are situated.

Figure 5A:
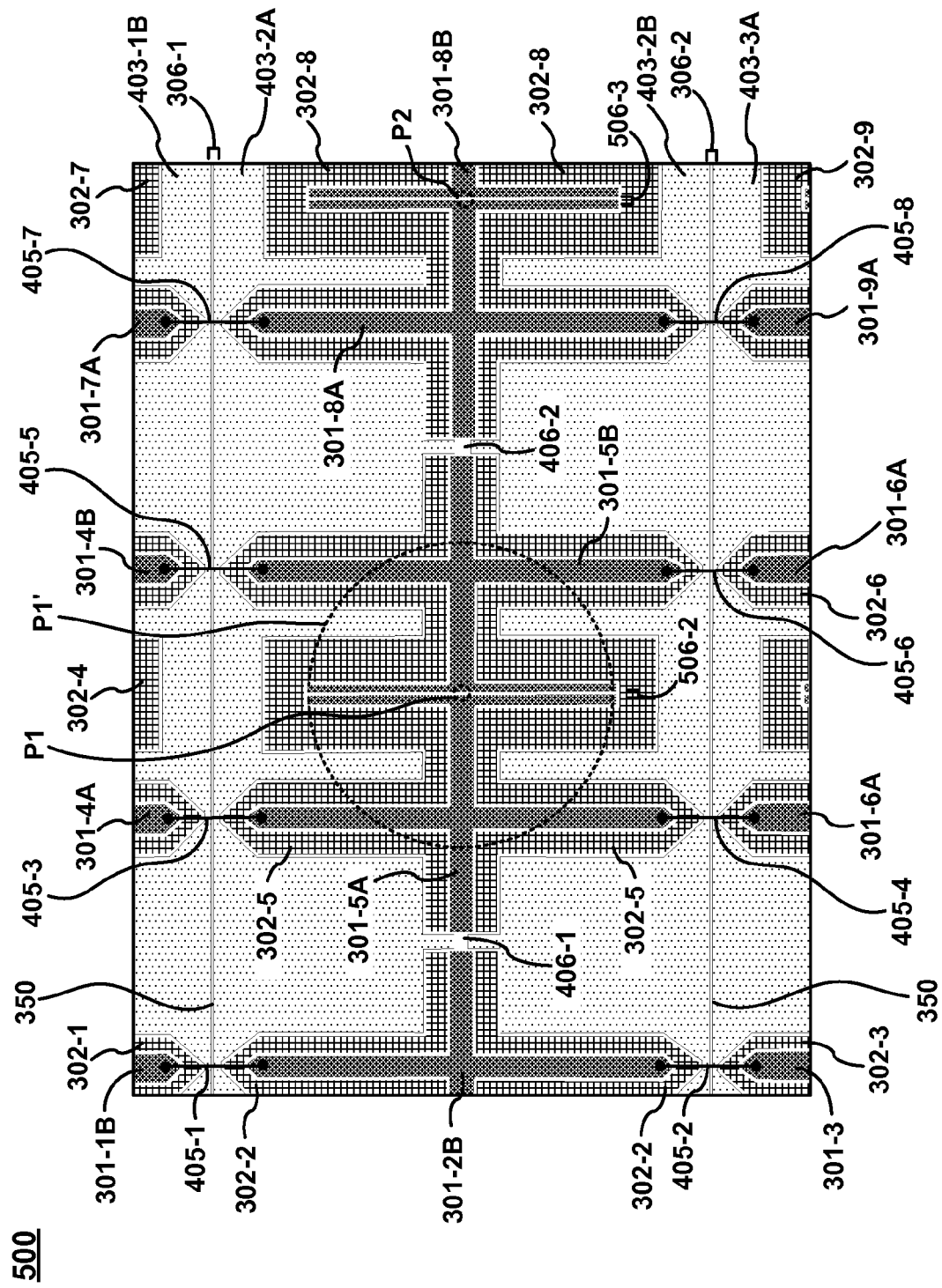
FIG. 5A illustrates features of a capacitive sensor pattern, according to various embodiments.

FIG. 5A illustrates features of a capacitive sensor pattern 500, according to various embodiments. Elements illustrated in FIGS. 3A, 3B, 4, and 5A with like item numbers are the same. Capacitive sensor pattern 500 differs from capacitive sensor pattern 400 in one principle ways: receiver electrode elements have been split into left (A) and right (B) portions which can be received upon together to detect a full pixel response function or independently of one another when increases in image resolution are desired (such as when a small input object such as a pen tip has been detected or is attempting to be detected). For example, inclusion of gaps 506 (506-2 and 506-3 illustrated) bisect receiver electrode elements 301 of FIGS. 3A and 4 into left and right halves (301-1B, 301-2B, 301-3B, 301-4A, 301-4B, 301-5A, 301-5B, 301-6A, 301-6B, 301-7A, 301-8A, and 301-9A visible). Jumpers 405 couple the bisected receiver electrode elements 301 into columns. For example, jumper 405-3 ohmically couples receiver electrode element 301-4A with receiver electrode element 301-5A, while jumper 405-4 ohmically couples receiver electrode element 301-4B with receiver electrode element 301-5B. As an example of the columnar couplings, receiver electrode elements 301-4A, 301-5A, and 301-6A are ohmically coupled together in a column through the use of jumpers.

In capacitive sensor pattern 500, when both halves of a split transmitter electrode element have transmitter signals transmitted on them and their resulting signals are received by both halves of a receiver electrode element that is surrounded by the two halves of the split transmitter sensor electrode, a full capacitive pixel and its corresponding pixel response function are generated. For example, by transmitting on split transmitter electrode element 403-2A and 403-2B and receiving resulting signals via a receiver electrode element 301-5A, 301-5B, a transcapacitive pixel centered on P1 is created along with a corresponding pixel response function. In one embodiment, the pixel response function of a capacitive pixel centered on P1 of capacitive sensor pattern 500 may be similar to pixel response function 250 of FIG. 2, where the pixel response function of a capacitive pixel centered on P1 has almost no overlap with the pixel response function of a capacitive pixel centered on P2.

Figure 5B:
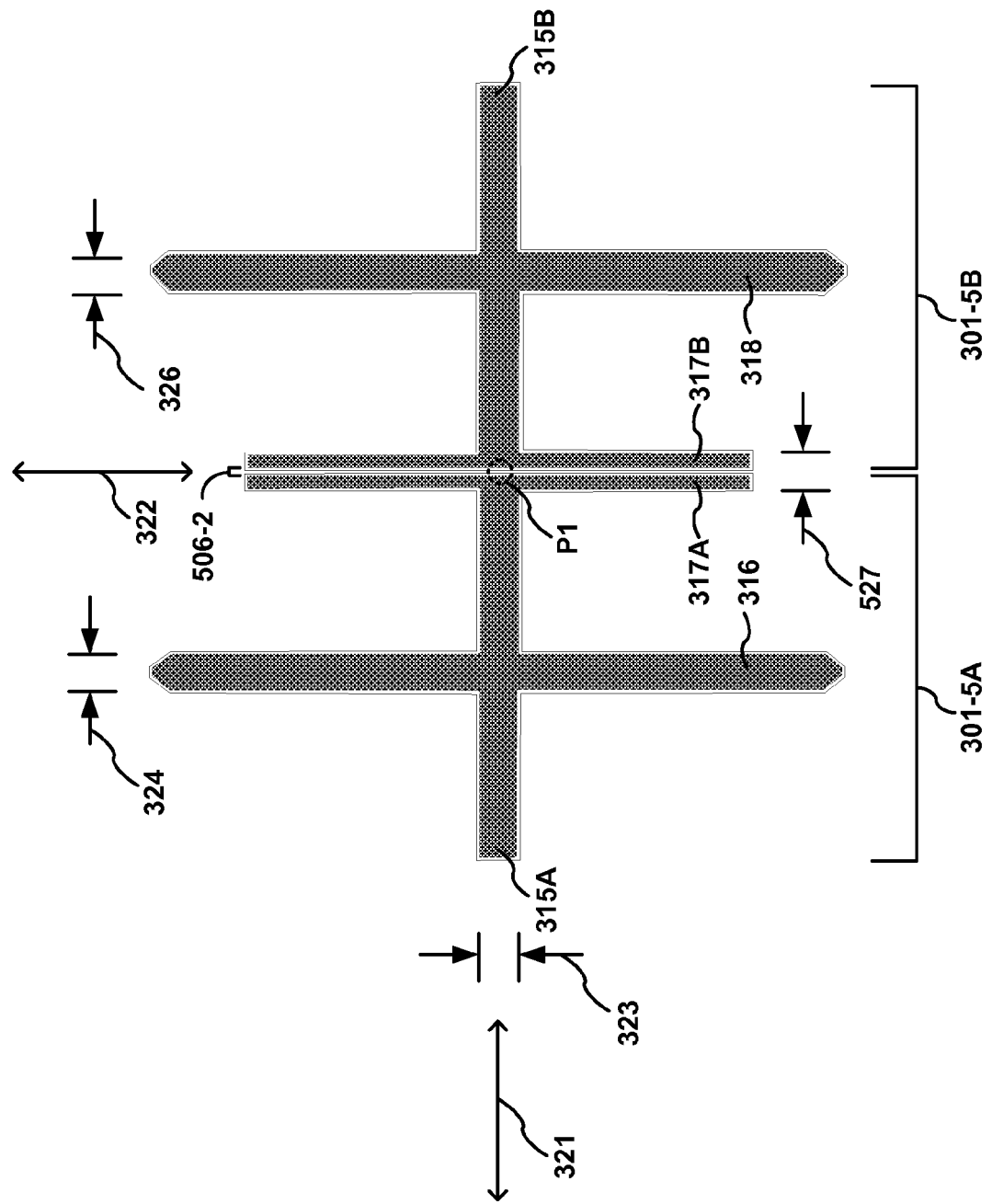
FIG. 5B illustrates an example receiver electrode element, according to various embodiments.

FIG. 5B illustrates an example of split receiver electrode elements, according to various embodiments. In comparison to the unsplit receiver electrode element 301-5, which is illustrated in FIG. 3A, the depiction of split receiver electrode elements 301-5A and 301-5B is very similar. The main difference is that gap 506-2 bisects component 315 along axis 322 through its midpoint to create two halves 301-5A, 301-5B. Component 317, when included, is also bisected in half to create components 317A and 317B, which have a cumulative width 527. Halves 301-5A and 301-5B are symmetrical with one another about axis 322 and self-symmetrical about axis 321.

In capacitive sensor pattern 500, a width 323, 324, and/or 326 of receiver electrode element 301-5A or 301-5B or a cumulative width 527 is less than a width along axis 322 of transmitter electrode element 303-2 within which receiver electrode element 301-5A or 301-5B is situated. In some embodiments of capacitive sensor pattern 500, a width 323, 324, and/or 326 of receiver electrode element 301-5A or 301-5B is greater than a width of an adjacent floating electrode element 302-5 which is disposed between receiver electrode element 301-5A or 301-5B and the transmitter electrode element 303-2A and/or 303-2B within which both receiver electrode element 301-5A or 301-5B and adjacent floating electrode element 302-5 are situated.

Figure 6:
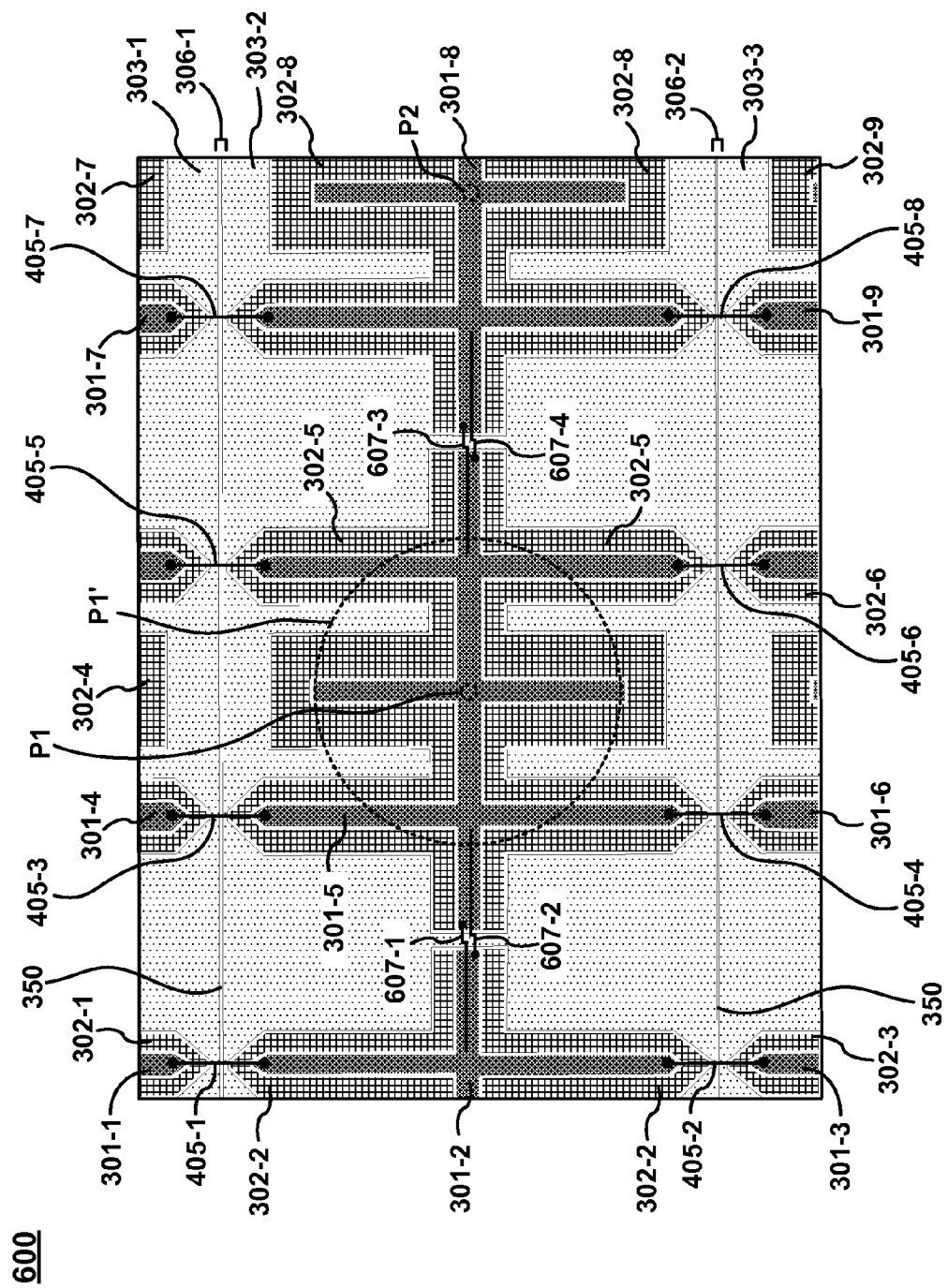
FIG. 6 illustrates features of a capacitive sensor pattern, according to various embodiments.

FIG. 6 illustrates features of a capacitive sensor pattern 600, according to various embodiments. Elements illustrated in FIGS. 3A, 3B, 4, 5A, and 5B with like item numbers are the same. Capacitive sensor pattern 600 differs from previously described capacitive sensor patterns in one principle way: extension elements ("extensions") 607 are illustrated which ohmically extend the footprint of individual receiver electrode elements in a first receiver electrode column into the footprint of an adjacent receiver electrode element in a different receiver electrode column. In various embodiments, extensions 607 are deposited in the same layer as jumpers 405.

Extensions 607 allow the footprints of adjacent receiver electrode elements 301 (from separate receiver electrode columns) to overlap one another. This causes a partial overlap of the capacitive pixels associated with the individual receiver electrode elements 301 and thus an overlap of their respective pixel response functions. Such overlap facilitates differentiating the location of small input objects sensed in the regions between adjacent pixels of adjacent columns of ohmically coupled receiver electrode elements. In one embodiment, the pixel response function of a capacitive pixel centered on P1 in capacitive sensor pattern 600 may be similar to pixel response function 260 of FIG. 2, where the pixel response function of a capacitive pixel centered on P1 has moderate overlap with the pixel response function of a capacitive pixel centered on P2.

Extensions 607 (607-1, 607-2, 607-3, 607-4 visible) are all disposed in the same layer as jumpers 405, which is separate layer from the single layer in which receiver electrode elements 301, floating electrode elements 302, and transmitter electrode elements 303 are all commonly deposited. An extension 607 is similar to a jumper 405, but is only ohmically coupled to a single receiver electrode element 301. This, in essence, makes an extension 607 a jumper to nowhere which is ohmically coupled with its source, but not with a destination. For example extension 607-1 is coupled with and extends receiver electrode element 301-5 into the footprint of adjacent receiver electrode element 301-2. However, extension 607-1 does not ohmically couple receiver electrode element 301-5 with receiver electrode element 301-2. In a similar fashion, extension 607-2 is coupled with and extends receiver electrode element 301-2 into the footprint of adjacent receiver electrode element 301-5. However, extension 607-2 does not ohmically couple receiver electrode element 301-2 with receiver electrode element 301-5. Likewise extension 607-4 is coupled with and extends receiver electrode element 301-5 into the footprint of adjacent receiver electrode element 301-8. However, extension 607-4 does not ohmically couple receiver electrode element 301-5 with receiver electrode element 301-8. In a similar fashion, extension 607-3 is coupled with and extends receiver electrode element 301-8 into the footprint of adjacent receiver electrode element 301-5. However, extension 607-3 does not ohmically couple receiver electrode element 301-8 with receiver electrode element 301-5.

For purposes of clarity, insulating material which prevents undesired ohmic couplings of an extension 607 has not been illustrated. However, it is appreciated that such insulating material is disposed in a layer which is between portions of an extension element 607 and any sensor electrode elements which are spanned by an extension element 607 but not ohmically coupled with the extension element 607. For example, with reference to extension 607-1, undepicted insulating material prevents extension 607-1 from ohmically coupling with transmitter electrode element 303-2 or receiver electrode element 301-2.

Figure 7A:
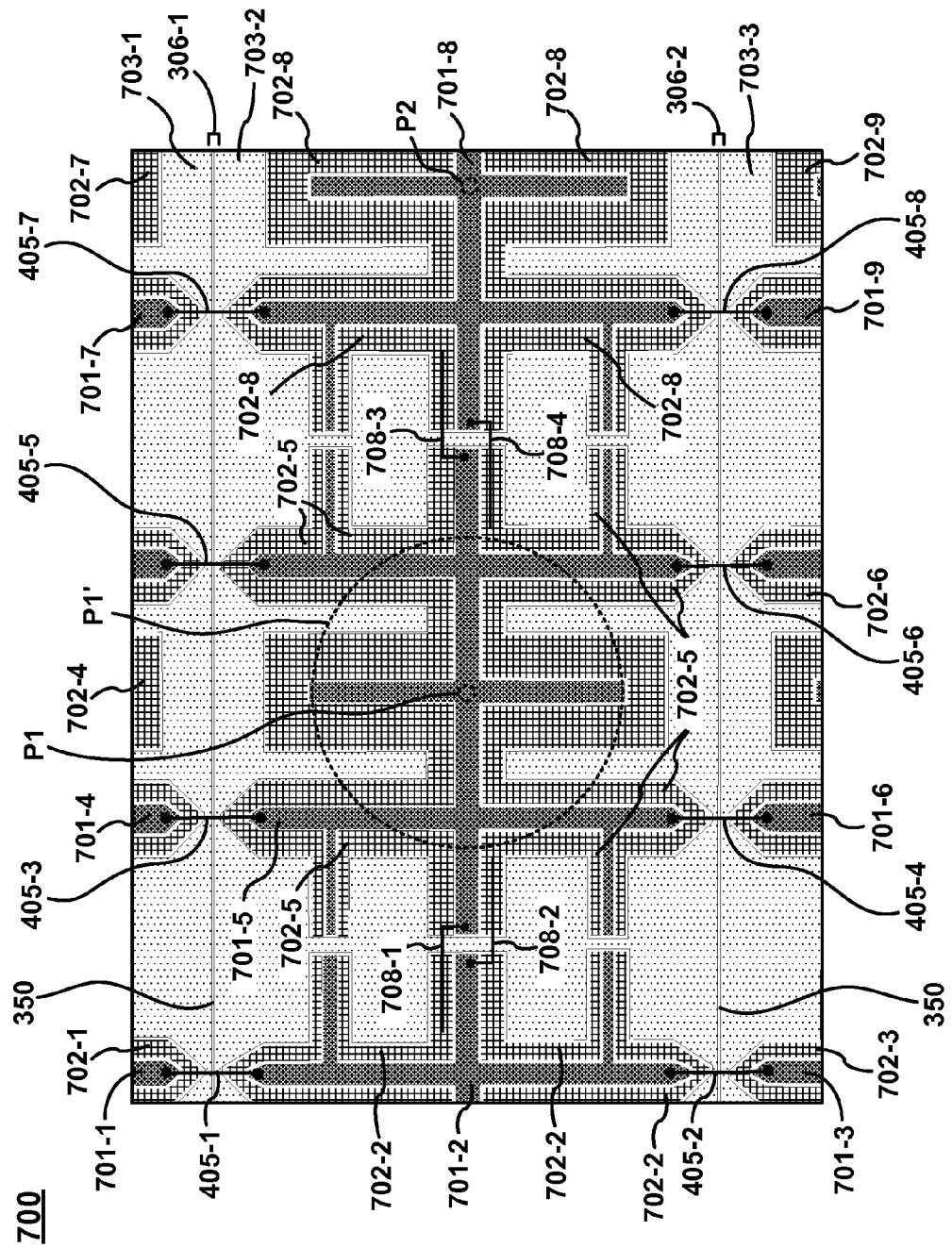
FIG. 7A illustrates features of a capacitive sensor pattern, according to various embodiments.

FIG. 7A illustrates features of a capacitive sensor pattern 700, according to various embodiments. Elements illustrated in FIGS. 3A, 3B, 4, 5A, 5B, and 6 with like item numbers are the same. Capacitive sensor pattern 700 differs from previously described capacitive sensor patterns in two principles ways: (1) receiver electrode element tines have been added in the receiver electrode element deposition layer to the previously illustrated configuration of receiver electrode elements 301 to create the illustrated configuration of receiver electrode elements 701; and (2) extension elements 708 have been added in the same deposition layer as jumpers 405. This combination of extension elements 708 and receiver electrode element tines in the receiver electrode deposition layer broadens the footprint of a capacitive pixel with which a receiver electrode element 701 is associated, and thus causes some overlap in pixel response functions of adjacent capacitive pixels generated by different columns of ohmically coupled receiver electrode elements.

Receiver electrode element tines in the receiver electrode element deposition layer allow the footprints of adjacent receiver electrode elements 701 (from separate columns of ohmically coupled receiver electrode elements) to extend toward one another in several locations. This causes a partial overlap of the capacitive pixels associated with the individual receiver electrode elements 301 and thus an overlap of their respective pixel response functions. In one embodiment, the pixel response function of a capacitive pixel centered on P1 of capacitive sensor pattern 700 may be similar to pixel response function 270 of FIG. 2, where the pixel response function of a capacitive pixel centered on P1 has substantial overlap with the pixel response function of a capacitive pixel centered on P2. Such broadening of the pixel response functions facilitates differentiating the location of small input objects sensed in the regions between adjacent capacitive pixels of adjacent columns of ohmically coupled receiver electrode elements. Capacitive sensor pattern 700 replaces receiver electrode elements 301 with receiver electrode elements 701 (701-1, 701-2, 701-3, 701-4, 701-5, 701-6, 701-7, 701-8, 701-9 illustrated). This alters the shape of both receiver electrode elements and floating electrode elements that are disposed in the common layer with the receiver electrode elements 701. These new shapes are depicted by floating electrode elements 702 (702-1, 702-2, 702-3, 702-4, 702-5, 702-6, 702-7, 702-8, 702-9 illustrated) and transmitter electrode elements 703 (703-1, 703-2, and 703-3 depicted).

Extensions 708 differ from extensions 607 in that they ohmically extend a receiver electrode element into a region associated with a floating electrode element 702 that surrounds an adjacent receiver electrode element in a neighboring column of receiver electrode elements 701. Extensions 708 (708-1, 708-2, 708-3, 708-4 visible) are all disposed in the same layer as jumpers 405, which is separate layer from the single layer in which receiver electrode elements 701, floating electrode elements 702, and transmitter electrode elements 703 are all commonly deposited. An extension 708 is similar to a jumper 405, but is only ohmically coupled to a single receiver electrode element 701. This, in essence, makes an extension 708 a jumper to nowhere which is ohmically coupled with its source, but not with a destination. For example extension 708-1 is coupled with and extends receiver electrode element 701-5 into the footprint associated with floating electrode element 702-2 which substantially surrounds adjacent receiver electrode element 701-2. However, extension 708-1 does not ohmically couple receiver electrode element 701-5 with receiver electrode element 701-2. In a similar fashion, extension 708-2 is coupled with and extends receiver electrode element 701-2 into the footprint associated with floating electrode element 702-5 which substantially surrounds adjacent receiver electrode element 701-5. However, extension 708-2 does not ohmically couple receiver electrode element 701-2 with receiver electrode element 701-5. Likewise extension 708-4 is coupled with and extends receiver electrode element 701-5 into the footprint associated with floating electrode element 702-8 which substantially surrounds adjacent receiver electrode element 701-8. However, extension 708-4 does not ohmically couple receiver electrode element 701-5 with receiver electrode element 701-8. In a similar fashion, extension 708-3 is coupled with and extends receiver electrode element 701-8 into the footprint associated with floating electrode element 702-5 which substantially surrounds adjacent receiver electrode element 701-5. However, extension 708-3 does not ohmically couple receiver electrode element 701-9 with receiver electrode element 701-5.

For purposes of clarity, insulating material which prevents undesired ohmic couplings of an extension 708 has not been illustrated. However, it is appreciated that such insulating material is disposed in a layer which is between portions of an extension 708 and any sensor electrode elements which are spanned by an extension element 708 but not ohmically coupled with the extension element 708. For example, with reference to extension 708-1, undepicted insulating material prevents extension 708-1 from ohmically coupling with transmitter electrode element 703-2 or floating electrode element 702-2.

In capacitive sensor pattern 700, when a transmitter electrode element has a transmitter signal transmitted on it and the resulting signal is received by a receiver electrode element that is surrounded by the transmitter sensor electrode, a full capacitive pixel and its corresponding pixel response function are generated. For example, by transmitting on transmitter electrode element 703-2 and receiving a resulting signal via a receiver electrode element 701-5, a transcapacitive pixel centered on P1 is created along with a corresponding pixel response function.

Figure 7B:
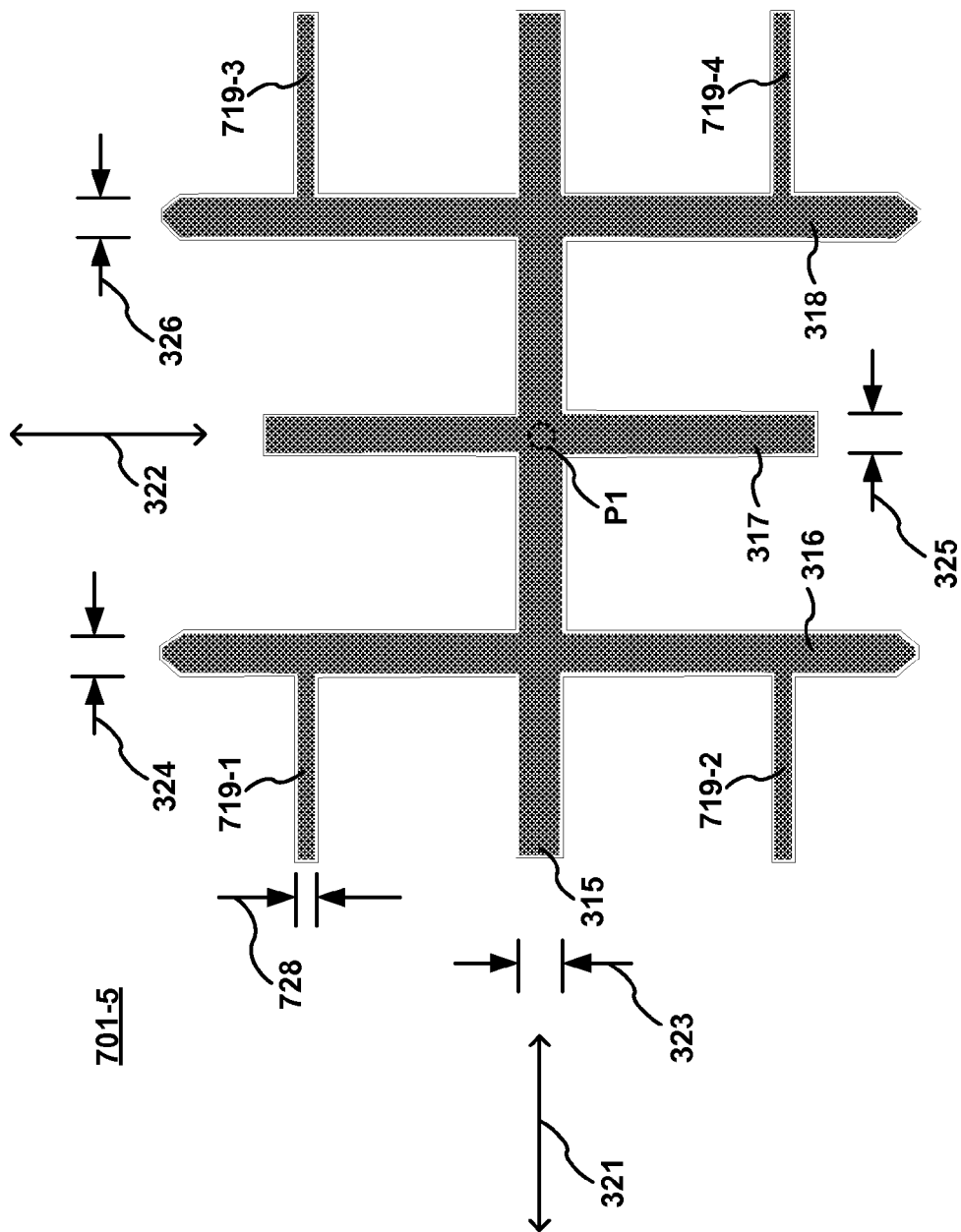
FIG. 7B illustrates an example receiver electrode element, according to various embodiments.

FIG. 7B illustrates an example receiver electrode element 701, according to various embodiments. In particular, receiver electrode element 701-5 from FIG. 7A is illustrated. It is appreciated that other receiver electrode elements 701 in capacitive sensor pattern 700 are substantially identical to receiver electrode element 701-5, except where truncated on edge portions of a capacitive sensor pattern 700. Receiver electrode element 701-5 includes a central component 315 which is disposed lengthwise along axis 321 and has a width 323. Axis 321 is parallel to the lengthwise axis of transmitter electrode element 703-2. Central component 315 is bar shaped and is traversed substantially orthogonally by components 316 and 318 as is similarly illustrated in FIG. 3B.

Components 316 and 318 have at least two receiver electrode element tines 719 (719-1, 719-2, 719-3, 719-4) coupled to each. Extension receiver electrode element tines 719 have a width 728 which is the same or less than a width of the component 316, 318 to which they are coupled. Receiver electrode element tines 719 are bar shaped and are disposed lengthwise in parallel with axis 321 and component 315, and generally do not extend in length past the distal ends of component 315.

In some embodiments of capacitive sensor pattern 700, the distal end portions of component 315 and receiver electrode element tines 719 are the only portions which are not surrounded by a floating electrode element in capacitive sensor pattern 700. In this sense, receiver electrode element 701-5 (and like receiver electrode elements 701) is substantially surrounded by floating electrode element 702-5.

In various embodiments, components of receiver electrode element 701-5 are disposed such that receiver electrode element 701-5 is symmetrical when folded in half along axis 321 and when folded in half along axis 322.

In capacitive sensor pattern 700, a width 323, 324, 325, 326, and/or 728 of receiver electrode element 701-5 is less than a width along axis 322 of transmitter electrode element 703-2 within which receiver electrode element 701-5 is wholly situated. In some embodiments of capacitive sensor pattern 700, a width 323, 324, 325, 326 and/or 728 of receiver electrode element 701-5 is greater than a width of an adjacent floating electrode element 702-5 which is disposed between receiver electrode element 701-5 and the transmitter electrode element 703-2 within which both receiver electrode element 701-5 and floating electrode element 702-5 are wholly situated.

Figure 8:
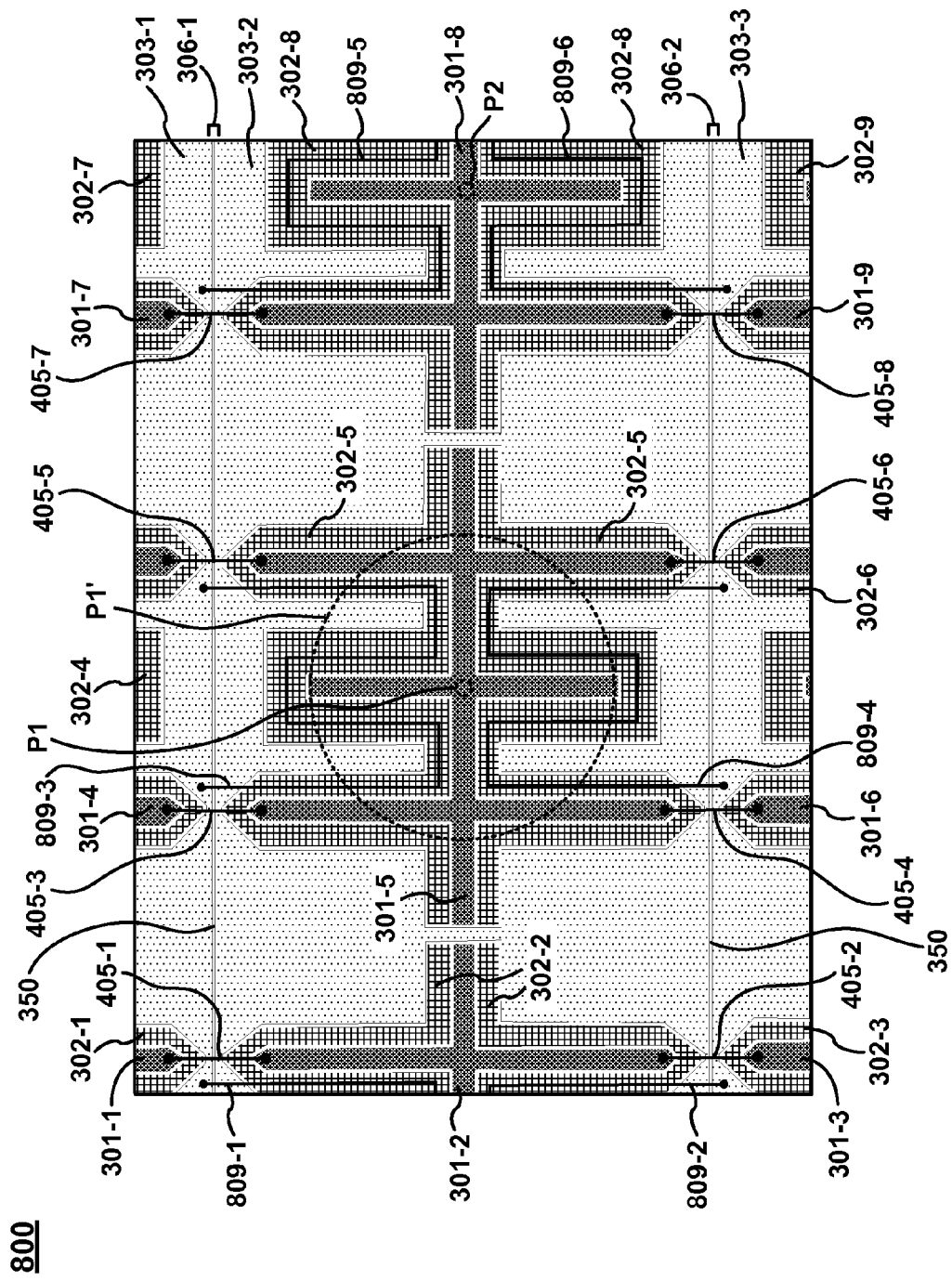
FIG. 8 illustrates features of a capacitive sensor pattern, according to various embodiments.

FIG. 8 illustrates features of a capacitive sensor pattern 800, according to various embodiments. Elements illustrated in FIGS. 3A, 3B, 4, 5A, 5B, 6, 7A, and 7B with like item numbers are the same. Capacitive sensor pattern 800 differs from previously described capacitive sensor patterns in one principle way: extension elements ("extensions") 809 are illustrated which ohmically extend the footprint individual transmitter electrode elements 303 into the footprint of an adjacent transmitter electrode element 303. In various embodiments, extensions 809 are deposited in the same layer as jumpers 405.

Extensions 809 (809-1, 809-2, 809-3, 809-4, 809-5, 809-6 visible) are all disposed in the same layer as jumpers 405, which is separate layer from the single layer in which receiver electrode elements 301, floating electrode elements 302, and transmitter electrode elements 303 are all commonly deposited. Extensions 809 allow the footprints of adjacent transmitter electrode elements 303 to overlap one another. For example, extension 809-3 is ohmically coupled in two locations with transmitter electrode element 303-1 and extends transmitter electrode element 303-1 into a region within transmitter electrode element 303-2. There is no ohmic coupling of extension 809-3 with transmitter electrode element 303-2, merely an overlay. This causes a partial overlap of the capacitive pixels associated with the individual transmitter electrode elements 303-1 and 303-2 and thus an overlap of their respective pixel response functions. Similarly, extension 809-4 is ohmically coupled in two locations with transmitter electrode element 303-3 and extends transmitter electrode element 303-3 into a region within transmitter electrode element 303-2. There is no ohmic coupling of extension 809-4 with transmitter electrode element 303-2, merely an overlay. This causes a partial overlap of the capacitive pixels associated with the individual transmitter electrode elements 303-3 and 303-2 and thus an overlap of their respective pixel response functions. In one embodiment, the pixel response function of a capacitive pixel centered on P1 in capacitive sensor pattern 800 may be similar to pixel response function 260 of FIG. 2, where the pixel response function of a capacitive pixel centered on P1 has moderate overlap with the pixel response function of a capacitive pixel centered on P2. Due to inclusion of extensions 809, a similar or greater overlap of pixel response function may be seen with capacitive pixels in the same column as the capacitive pixel centered on P1 of capacitive sensor pattern 800. Such overlaps between transmitter electrode element regions facilitates differentiating the location of small input objects sensed in the regions between adjacent capacitive pixels within a column of ohmically coupled receiver electrode elements.

For purposes of clarity, insulating material which prevents undesired ohmic couplings of an extension 809 has not been illustrated. However, it is appreciated that such insulating material is disposed in a layer which is between portions of an extension element 809 and any sensor electrode elements which are spanned by an extension element 607 but not ohmically coupled with the extension element 809. For example, with reference to extension 809-3, undepicted insulating material prevents extension 809-3 from ohmically coupling with transmitter electrode element 303-2 or floating electrode element 302-5.

Figure 9:
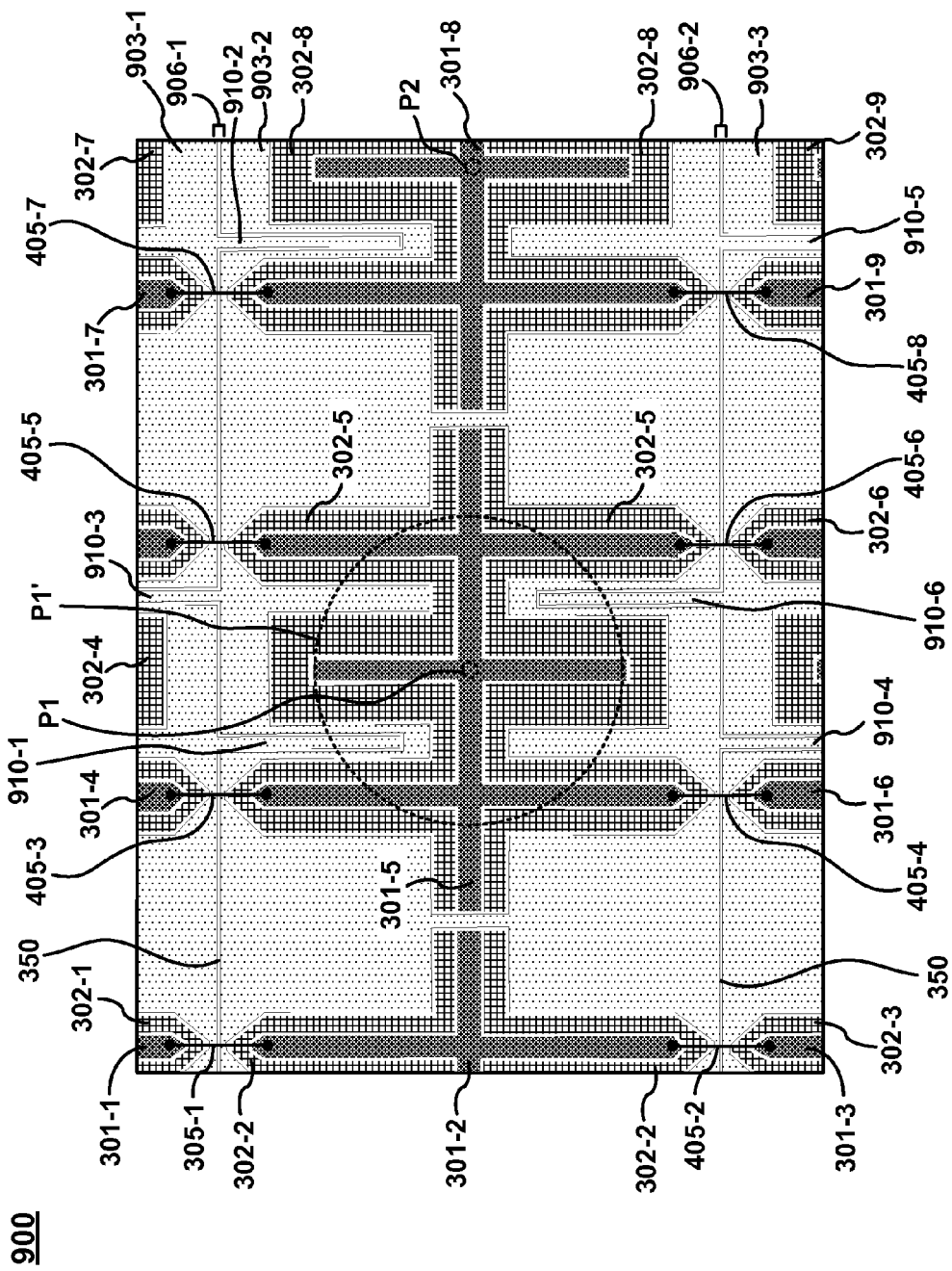
FIG. 9 illustrates features of a capacitive sensor pattern, according to various embodiments.

FIG. 9 illustrates features of a capacitive sensor pattern 900, according to various embodiments. Elements illustrated in FIGS. 3A, 3B, 4, 5A, 5B, 6, 7A, 7B, and 8 with like item numbers are the same. Capacitive sensor pattern 900 replaces transmitter electrode elements 303 with transmitter electrode elements 903 (903-1, 903-2, 903-3 illustrated), without altering the shape of either receiver electrode elements 301 or floating electrode elements 302 that are disposed in the common layer with the transmitter electrode elements 903. Capacitive sensor pattern 900 differs from previously described capacitive sensor patterns in one principles way: transmitter electrode element tines 910 have been added in the transmitter electrode element deposition layer to the previously illustrated configuration of transmitter electrode elements 303 to create the illustrated configuration of transmitter electrode elements 903. As can be seen, transmitter electrode element tines 910-1 and 910-2 ohmically extend transmitter electrode element 903-1 into the footprint of transmitter electrode element 903-2, while transmitter electrode element tine 910-3 ohmically extends transmitter electrode element 903-2 into the footprint of transmitter electrode element 903-1. Similarly, transmitter electrode element tines 910-4 and 910-5 ohmically extend transmitter electrode element 903-2 into the footprint of transmitter electrode element 903-3, while transmitter electrode element tine 910-4 ohmically extends transmitter electrode element 903-3 into the footprint of transmitter electrode element 903-2.

Inclusion of one or more transmitter electrode element tines 910 in the transmitter deposition layer broadens the footprint of a capacitive pixel with which a transmitter electrode element 903 is associated, and thus cause some overlap in pixel response functions of adjacent capacitive pixels generated within a column of ohmically coupled receiver electrode elements. In one embodiment, the pixel response function of a capacitive pixel centered on P1 in capacitive sensor pattern 900 may be similar to pixel response function 260 of FIG. 2, where the pixel response function of a capacitive pixel centered on P1 has very little overlap with the pixel response function of a capacitive pixel centered on P2. Due to inclusion of transmitter electrode element tines 910, a moderate overlap of pixel response function may be seen with capacitive pixels in the same column as the capacitive pixel centered on P1 of capacitive sensor pattern 900. Such broadening of the pixel response functions facilitates differentiating the location of small input objects sensed in the regions between adjacent capacitive pixels within a column of ohmically coupled receiver electrode elements.

In FIGS. 3A-9, for purposes of clarity of illustration and explanation, various techniques of ohmically extending receiver and/or transmitter elements into the capacitive pixels associated with adjacent receiver and/or transmitter elements have been illustrated and described in isolation from one another. However, it is appreciated that these techniques can be utilized in various combinations with one another to mechanically cause varying amounts of overlap in pixel response functions of adjacent capacitive pixels. With reference again to FIG. 2, in general, FIG. 2 illustrates that the more techniques of ohmic extensions (to include both extensions and tines as described above) of receiver and/or transmitter sensor elements that are employed, the more the overlap of pixel response functions is mechanically caused to increase. The amount of overlap that is desirable is dependent upon the intended use of a capacitive sensor pattern.

Example Method of Manufacture of a Capacitive Sensor Pattern

FIG. 10 illustrates a flow diagram of an example method of manufacture of a capacitive sensor pattern, in accordance with various embodiments. For purposes of illustration, during the description of flow diagram 1000, reference will be made to features illustrated in one or more of FIGS. 3A-9. In some embodiments, not all of the procedures described in flow diagram 1000 are implemented. In some embodiments, other procedures in addition to those described may be implemented. In some embodiments, procedures described in flow diagram 1000 may be implemented in a different order than illustrated and/or described.

At 1010 of flow diagram 1000, in one embodiment, a first plurality of sensor electrode elements is deposited in a first layer above a substrate. The first plurality of sensor electrode elements can be etched, sputtered, screened, or otherwise deposited. For example, with reference to FIGS. 3A-9, this can comprise depositing receiver electrode elements (301, 701), transmitter electrode elements (303, 703, 903) in a first common deposition layer above a substrate 350. In some embodiments, this may also comprise disposing floating electrode elements (302, 702) in this first common deposition layer. In some embodiments, the sensor electrode element disposed in this first layer may be composed of the same material as one another (e.g., ITO or other similar conductive material utilized in construction of capacitive sensors), thus allowing deposition of all of the elements of the first layer in a single deposition step. Transmitter electrode elements that are deposited are configured to transmit a transmitter signal that is supplied by a processing system, such as processing system 110. Receiver electrode elements that are deposited are configured to receive a resulting signal that corresponds to a transmitted transmitter signal, and then couple the received resulting signal to a processing system, such as processing system 110.

At 1020 of flow diagram 1000, in one embodiment, a second plurality and a third plurality of sensor electrode elements are deposited above the substrate. The second and third plurality of sensor electrode elements may be deposited in a single common step and layer with one another, or in separate deposition steps and/or layers. The second and third pluralities of sensor electrode elements can be etched, sputtered, screened, or otherwise deposited. This can comprise the deposition of jumpers 405 and/or extensions (607, 708, 809). At least one element from the second plurality physically is coupled to at least two elements from the first plurality. An example illustrating such a coupling is jumper 405-3 of FIG. 4, which ohmically couples receiver electrode elements 301-4 and 301-5. Such ohmic couplings may couple a first receiver electrode element associated with a first capacitive pixel to a second receiver electrode element associated with a second capacitive pixel, wherein the second capacitive pixel is adjacent to the first capacitive pixel. At least one element from the third plurality is coupled to a single element from the first plurality. This coupling may be an ohmic coupling which allows electrical continuity between the coupled elements. Some examples which illustrate such a coupling to only one element of the first plurality include: extension 607-1 of FIG. 6 that is only ohmically coupled with receiver electrode element 301-5; extension 708-1 of FIG. 7A that is only ohmically coupled with receiver electrode element 701-5; and extension 809-3 of FIG. 8 that is only ohmically coupled with transmitter electrode element 303-1. These couplings are utilized in some embodiments for ohmically extending a portion of a feature associated with a first capacitive pixel into a region associated with an adjacent second capacitive pixel. For example, extension 708-1 extends receiver electrode element 701-5 from a physical region associated with its own capacitive pixel into a physical region of the capacitive pixel associated with receiver electrode element 701-2.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:
1. A capacitive sensor pattern comprising:
a first plurality of sensor electrode elements disposed in a first layer, said first plurality of sensor electrode elements comprising a plurality of receiver electrode elements, wherein a receiver electrode element of said plurality of receiver electrode elements comprises a central component traversed substantially orthogonally by at least two additional components;
a second plurality of sensor electrode elements disposed in a second layer selectively coupled to at least two of said first plurality of sensor electrode elements; and a third plurality of sensor electrode elements disposed in said second layer, each element of said third plurality selectively coupled to one sensor electrode element of said first plurality of sensor electrode elements, such that said first and third plurality of elements are configured to generate overlapping pixel response functions between adjacent pixels of said capacitive sensor pattern.

2. The capacitive sensor pattern of claim 1, wherein said receiver electrode element is symmetrical along two axes.

3. The capacitive sensor pattern of claim 1, wherein said first plurality of sensor electrode elements further comprises a transmitter electrode element that extends lengthwise along a first axis and widthwise along a second axis, and wherein said central component of said receiver electrode element is substantially parallel to said first axis of said transmitter electrode element.

4. The capacitive sensor pattern of claim 1, wherein said first plurality of sensor electrode elements further comprises a floating electrode element and wherein said receiver electrode element is substantially surrounded by said floating electrode element.

* * * * *